United States Patent
Seki et al.

[11] Patent Number: 6,082,764
[45] Date of Patent: Jul. 4, 2000

[54] VEHICLE OCCUPANT RESTRAINING SYSTEM

[75] Inventors: Makito Seki; Mitsuo Shimotani; Minoru Nishida, all of Tokyo, Japan

[73] Assignee: Mitsubishi Denki Kabushiki Kaisha, Tokyo, Japan

[21] Appl. No.: 09/084,450

[22] Filed: May 27, 1998

[30] Foreign Application Priority Data

Jul. 1, 1997 [JP] Japan .................................. 9-175771

[51] Int. Cl.[7] .................................................. B60R 21/32
[52] U.S. Cl. ............................................................ 280/735
[58] Field of Search .............................. 280/735; 704/45, 704/49

[56] References Cited

U.S. PATENT DOCUMENTS

| | | | |
|---|---|---|---|
| 5,348,343 | 9/1994 | Hawthorn | 280/735 |
| 5,406,127 | 4/1995 | Furui et al. | 307/10.1 |
| 5,521,580 | 5/1996 | Kaneko et al. | 340/439 |
| 5,604,818 | 2/1997 | Saitou et al. | 382/128 |
| 5,621,457 | 4/1997 | Ishiwaka et al. | 348/78 |
| 5,657,831 | 8/1997 | Furui | 180/282 |
| 5,835,613 | 11/1998 | Breed et al. | 425/89 |
| 5,845,000 | 12/1998 | Breed et al. | 425/89 |
| 5,927,752 | 7/1999 | Brandin | 280/735 |
| 5,983,147 | 11/1999 | Krumm | 701/45 |

FOREIGN PATENT DOCUMENTS 6-189906  12/1994  Japan .

*Primary Examiner*—Brian L. Johnson
*Assistant Examiner*—Michael Britton
*Attorney, Agent, or Firm*—Sughrue, Mion, Zinn, Macpeak & Seas, PLLC

[57] ABSTRACT

A vehicle occupant restraining system includes: a occupant restraining unit for restraining an occupant in a vehicle for his protection; a collision-recognition detecting unit for detecting whether or not the occupant recognizes an impending vehicle collision in advance; and a control unit for controlling the restraining operation of the occupant retraining unit depending on the result of the detection by the collision-recognition detecting unit.

18 Claims, 11 Drawing Sheets

|  | GAS AMOUNT ||
|  | LARGER AMOUNT | ORDINARY AMOUNT |
| --- | --- | --- |
| RESTRAINING OF HEAD OR NECK | EXCELLENT | FAIR |
| ABSORBING OF IMPACT | POOR | FAIR |

VEHICLE OCCUPANT RESTRAINING SYSTEM

BACKGROUND OF THE INVENTION

The present invention relates to a vehicle occupant restraining system for protecting, in the event of a vehicle collision, the occupant against great impacts by the collision. More particularly, the invention relates to a vehicle occupant restraining system including air bags and seat belts.

FIG. 13 is a block diagram showing a conventional vehicle occupant restraining system disclosed in Unexamined Japanese Patent Publication 6-206514. In FIG. 13, reference numeral 101 is an occupant; 102 is an air bag; 110 is a collision sensor for detecting a vehicle collision; 111 is an occupant position sensor for detecting a distance from an air bag storage position to the occupant 101; 112 is a gas source for supplying gas to the air bag 102 to inflate or expand the same; 113 is a gas-amount setting circuit for setting an amount of gas to be supplied to the air bag 102; and 114 is a gas-amount control circuit for controlling an amount of gas to be supplied to the air bag 102.

The operations of the conventional vehicle occupant restraining system before and after a vehicle collision occurs will be described with reference to a flow chart shown in FIGS. 14A and FIG. 14B. FIG. 14A is a flow chart showing the operations of the circuitry including the occupant position sensor 111 and the gas-amount setting circuit 113 in the prior occupant restraining system shown in FIG. 13. The circuitry repeats the operations of steps S101 and S102 at fixed periods independently of the operations of other circuits. In the step S101, the occupant position sensor 111 detects a distance from the storing position of the air bag 102 to the occupant 101. In the steps S102, the gas-amount setting circuit 113 determines an amount of gas for inflating the air bag 102 on the basis of a position of the occupant 101, and stores (sets) the result of the determining.

FIG. 14B is a flow chart showing the operation of the vehicle occupant restraining system when a vehicle collides with an obstacle, for example. In step S103 the collision sensor 110 detects a vehicle collision, and in step S104 the gas-amount control circuit 114 causes the gas source 112 to supply to the air bag 102 an amount of gas that is set, at that time, by the gas-amount setting circuit 113. In this way, gas is supplied to the air bag 102, and the air bag 102 is inflated to protect the occupant 101 from great impacts caused by the collision.

Usually, when the occupant notices and recognizes an impending vehicle collision in advance, he will take some action for the collision; perhaps he will get stiff. When he inattentively drives the vehicle and fails to notice the pressing vehicle collision, he cannot take any action for the collision, and is merely restrained by the air bag and the seat belt, and he receives great impacts. In an extreme case, only his head is forcibly pushed forward while his chest is fixed by the seat belt, and large load exerts on his neck, for example. In this case, the parts of the human body that must first be guarded from the large load are the head and the neck.

The occupant restraining system operates as just mentioned, and hence, it can change its control mode depending on an occupant position. However, the system cannot determine as to whether or not the occupant was aware of and recognized the impeding vehicle collision. In a case where a vehicle clashes into an obstacle in a state that the occupant inattentively fails to notice and recognize the collision, he receives great impacts without any action for the collision by the occupant. Therefore, only his head is forcibly pushed forward and large load exerts on his neck.

SUMMARY OF THE INVENTION

The present invention has been made to solve the above problem and has an object to provide an occupant restraining system for controlling an air bag and a seat belt depending on whether or not he recognizes an impending vehicle collision in advance.

To achieve the above object, there is provided a vehicle occupant restraining system comprising: occupant restraining means for restraining an occupant in a vehicle for his protection; collision-recognition detecting means for detecting whether or not the occupant recognizes an impending vehicle collision in advance; and control means for controlling the restraining operation of the occupant retraining means depending on the result of the detection by the collision-recognition detecting means.

The control means also controls a degree of the restraining.

The occupant restraining means consists of a plural number of restraining means.

The occupant restraining means includes first restraining means and second restraining means.

The control means selects occupant restraining means depending on the result of the detection by the collision-recognition detecting means.

The occupant restraining means is an air bag.

The control means controls an inflation of the air bag.

The control means controls the direction in which the air bag inflates.

The occupant restraining means is a seat belt.

The control means controls a tension of the seat belt.

The vehicle occupant restraining system further includes ambient-condition detecting means for detecting ambient conditions of a vehicle. The collision-recognition detecting means detects whether or not the occupant recognizes an impending vehicle collision depending on the result of the detection by the ambient-condition detecting means.

The vehicle occupant restraining system includes ambient-condition detecting means for detecting ambient conditions of a vehicle, and collision-anticipating means for anticipating an impending vehicle collision on the basis of the result of the detection by the ambient-condition detecting means. The control means controls the restraining operation of the occupant restraining means on the basis of an anticipation made by the collision-anticipating means.

The control means controls the restraining operation of the occupant restraining means on the basis of a time period ranging from an instant that the collision-anticipating means anticipates a vehicle collision till a vehicle collision actually occurs.

The control means controls a time at which the occupant restraining means starts the operation of restraining an occupant.

When the collision-recognition detecting means detects that an occupant fails to recognize a pressing vehicle collision, the control means performs such a control as to preferentially protect the head and/or the neck of the occupant against great impacts by collision.

When the collision-recognition detecting means detects that an occupant fails to recognize a pressing vehicle collision, the control means controls a tension of the seat belt in response to a reactive motion of the vehicle body by its collision.

The collision-recognition detecting means detects whether or not the occupant recognizes an impending vehicle collision on the basis of at least one of the direction in which the occupant turns his face, the direction of the sight line of the occupant and the keeping-awake state of the occupant.

Further, the collision-recognition detecting means detects whether or not the occupant recognizes an impending vehicle collision on the basis of a condition of the braking operation by the occupant.

BRIEF DESCRIPTION OF THE PREFERRED EMBODIMENTS

DETAILED DESCRIPTION OF THE PREFERRED EMBODIMENTS

First Embodiment

Figure 1:
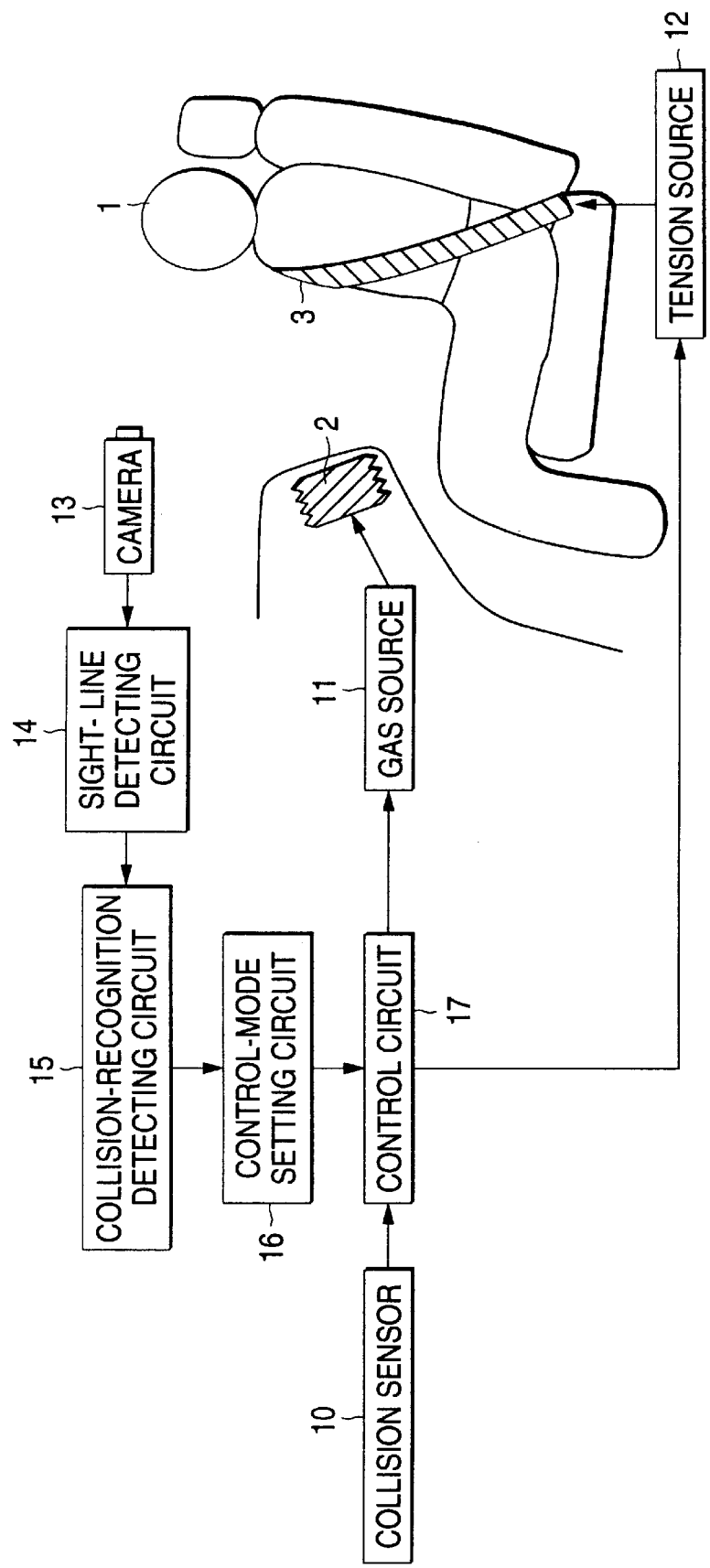
FIG. 1 shows in block and schematic form an arrangement of a vehicle occupant restraining system which is a first embodiment of the present invention.

FIG. 1 shows in block and schematic form an arrangement of a vehicle occupant restraining system which is a first embodiment of the present invention. In the figure, reference numeral 1 is an occupant; 2 is an air bag; 3 is a seat belt; 10 is a collision sensor for detecting a vehicle collision; 11 is a gas source for supplying gas to the air bag 2 to inflate or expand the air bag; 12 is an electronic or mechanical tension source for controlling a tension of the seat belt 3; 13 is a camera for photograph the face, for example, of the occupant 1; 14 is a sight-line detecting circuit 14 for detecting the direction of occupant's sight line on the basis of an image of occupant's face; 15 is a collision-recognition detecting circuit for detecting whether or not the occupant 1 is aware of and recognizes a pressing vehicle collision in advance; 16 is a control-mode setting circuit for setting a control mode for controlling the inflation the air bag 2 and the tension of the seat belt 3; and 17 is a control circuit for actually controlling an inflation of the air bag 2 and a tension of the seat belt 3.

Figure 2:
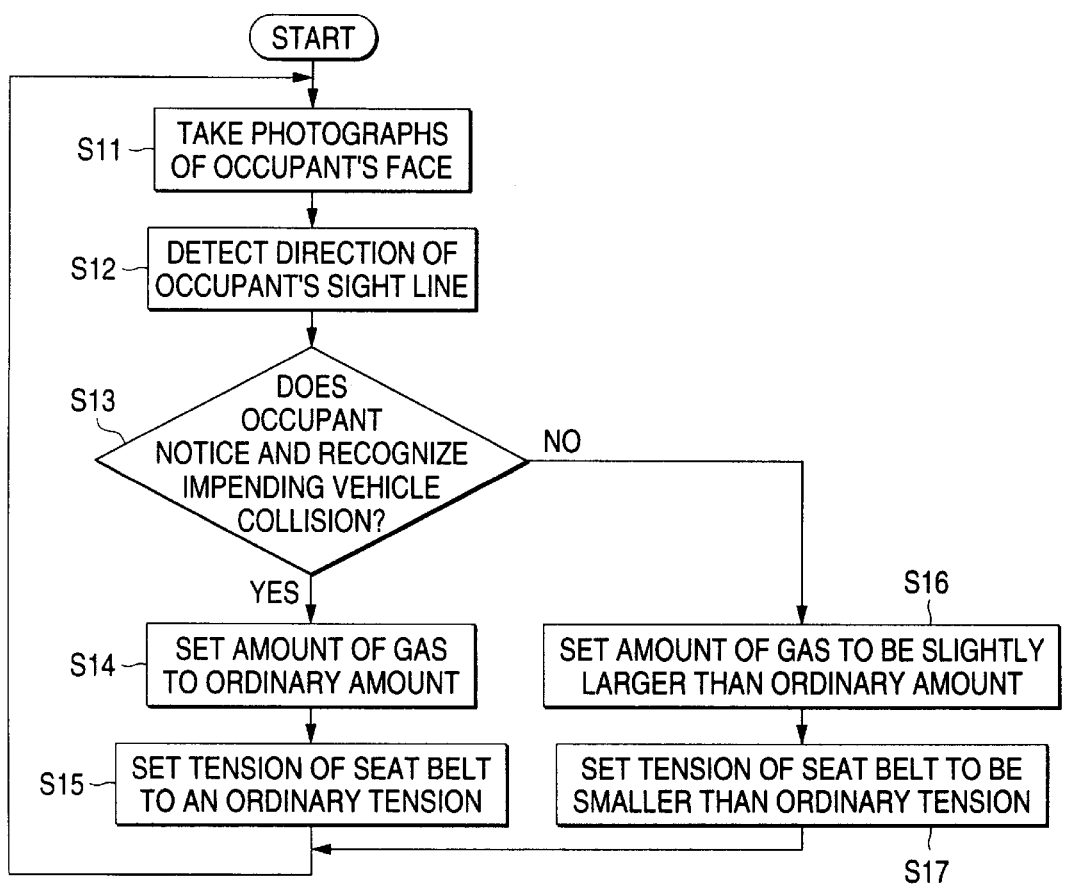
FIG. 2 is a flow chart showing the operation of the vehicle occupant restraining system of FIG. 1 before a vehicle collision occurs.

The operations of the thus arranged vehicle occupant restraining system before and after a vehicle collision occurs will be described with reference to flow charts of FIGS. 2 and 4. FIG. 2 is a flow chart showing a sequence of operations of a circuitry including the camera 13, sight-line detection circuit 14, collision-recognition detecting circuit 15, and control-mode setting circuit 16 (FIG. 1). A sequence of operations from steps S11 to S17 is repeated at fixed periods independently of the operations of other circuits.

In step S11, the camera 13 takes photographs of the face of the occupant 1. In step S12, the sight-line detecting circuit 14 detects the direction of occupant's sight line by processing the face image photographed, and sequentially stores the results of the processing in a proper memory (or its proper memory area). Examples of the image-processing basis technique for detecting the line of sight of the occupant are disclosed in U.S. Pat. No. 5,604,818 Unexamined Japanese Patent Publication No. 4-225478 and 6-261863. The technique of the former publication checks the iris of the occupant for his sight line. The technique of the latter publication projects light beams to the eyeballs (cornea or retinas) of the occupant 1 and picks up an image reflected therefrom for the sight line detection.

In step S13, the collision-recognition detecting circuit 15 examines time-sequential data on the sight-line direction at that time (the data having been gathered for ten (10) seconds). Specifically, the collision-recognition detecting circuit 15 assumes that the vehicle will come into a head-on collision, and judges, on this assumption, whether or not the occupant 1 notices and recognizes an impending vehicle collision depending on whether or not the occupant has looked forward within the time duration of 10 seconds. In this case, when he looked forward even once, the circuit 15 considers that the occupant recognized a pressing vehicle collision. The time duration for gathering the timesequential data is not limited to 10 seconds, but may be longer or shorter than 10 seconds, and it may be any other proper time duration determined depending on a vehicle speed, for example.

If the collision-recognition detecting circuit 15 judges that the occupant 1 has recognized that a vehicle collision is impending (step S13), the control-mode setting circuit 16 then operates in a first control mode. In this mode, the circuit 16 sets an amount of gas used for inflating the air bag 2 to a predetermined amount of gas (referred frequently to as an ordinary-collision gas amount) for an ordinary vehicle collision (step S14). Then, the control-mode setting circuit 16 sets a tension of the seat belt 3 to a value of tension (referred frequently to as an ordinary-collision tension value) for the ordinary vehicle collision (step S15). This step merely sets the tension value of the seat belt at the ordinary-collision tension value, and does not expand the air bag 2 and extend/contract the seat belt 3.

If the collision-recognition detecting circuit 15 judges that the occupant 1 failed to notice and recognize an impending vehicle collision occurrence in step S13, the control-mode setting circuit 16 then operates in a second control mode. In this mode, the circuit 16 sets the amount of gas to be slightly larger than the ordinary-collision gas amount in step S16. Where the gas amount is larger than the ordinary-collision gas amount, the inflation of the air bag 2 is large and hence, the head and the neck of the occupant 1 are firmly held back and their protection is reliable, as seen from a table of FIG. 3. In this case, a pressure within the air bag is relatively large, and accordingly, the air bag is more hard. Therefore, the ability of the air bag to absorb the impact by the collision is inferior to that when the gas amount is the ordinary-collision gas amount. Thus, the gas amount set is somewhat larger than the ordinary-collision gas amount in the vehicle occupant restraining system of the present embodiment. Therefore, the ability of absorbing the impact is somewhat lost, and the impact to the occupant is correspondingly increased. The reason why the gas amount is thus set will be given hereunder.

When the occupant 1 inadvertently fails to notice and recognize the impending vehicle collision, he receives great impacts without taking any action for the vehicle collision. In an extreme case, only the head of the occupant 1 is forcibly pushed forward while his chest is fixed. Great load exerts on his neck and other parts. Therefore, in this situation, the necessity is to preferentially protect the head and the neck of the occupant 1. It is for this reason that the amount of gas fed to the air bag 2 is set to be larger than the ordinary-collision gas amount. When the occupant notices and recognizes the impending vehicle collision, he will get stiff and cope with the impact by the collision to some extent. Therefore, in this situation, the amount of gas to the air bag is set to be equal to the ordinary-collision gas amount, i.e., the amount of gas for the ordinary vehicle collision.

In step S17, the control-mode setting circuit 16 sets a tension of the seat belt 3 to be somewhat smaller in magnitude than a tension for the ordinary vehicle collision so as to absorb a reaction to the impact by the collision. The reason why the tension of the seat belt 3 is so set is the same as the above reason, viz., it is so set in order to lessen the load on the neck and other parts.

The sequence of the operations from the steps Sll to S17 is repeated.

The operation of the vehicle occupant restraining system at the time of a vehicle collision will be described with reference to FIG. 4. The collision sensor 10 senses a vehicle collision in step S18. If the vehicle collides with an obstacle, the control circuit 17 causes the gas source 11 to supply to the air bag 2 an amount of gas that is set, at that time, by the control-mode setting circuit 16. And the control circuit 17 controls a tension of the seat belt 3, by use of the tension source 12, in accordance with a value of tension that is set, at that time, by the control-mode setting circuit 16. In this way, the air bag 2 is expanded and the seat belt 3 is fixed or extended/contracted, whereby the occupant 1 is protected against impacts by the collision.

As described above, the above-mentioned first embodiment controls the inflation of the air bag and the tension of the seat belt depending on whether or not the occupant recognizes a pressing vehicle collision. Therefore, even if a vehicle collision occurs in a state that the driver inattentively drives the vehicle and fails to notice and recognize the about-to-happen vehicle collision, the occupant is protected against impacts applied to him because the load on the neck and other parts of the occupant is lessened.

In the first embodiment, the control mode for controlling the inflation of the air bag and the tension of the seat belt is selected in advance before the collision sensor senses a vehicle collision. If required, the control mode may be selected in advance after the collision sensor senses a vehicle collision.

According to the first embodiment, it is first detected whether or not the occupant is aware of and recognizes a pressing vehicle collision, and then a control mode is set up on the basis of the result of the detection. When the vehicle occupant restraining system detects the fact that the occupant, who has not noticed an impending vehicle collision occurrence, is aware of and recognizes the vehicle collision, viz., an occupant's collision-recognition state is changed from a non-recognition state to a recognition state, the control mode may be changed to another after about one (1) second from its detection. By so doing, in such a situation where the occupant is aware of and recognizes the impending collision just before it occurs, but he is late in recognition of the collision and a time till the collision occurs is too short for the occupant to take some action for the collision, the vehicle occupant restraining system employs the control mode for the non-recognition state of the occupant to reliably protect the occupant from the collision impact.

In the first embodiment, when the occupant is in a non-recognition state, the second control mode to preferentially protect the head and the neck of the human body is selected.

In this control mode, the amount of gas supplied to the air bag is increased to be somewhat larger than the ordinary-collision gas amount. The first embodiment may be modified such that a plural number of air bags are stored, and the number of air bags to be inflated and/or the locations of the air bags are selected depending on the occupant's recognition state.

In the second control mode of the first embodiment which is used when the occupant is in a non-recognition state, the amount of gas supplied to the air bag is increased to be larger than the ordinary-collision gas amount, and the tension of the seat belt is decreased to be somewhat smaller in value than the ordinary-collision tension. In a modification, the gas amount and the tension value are controlled such that one of them is increased or decreased while the other is fixed at the ordinary-collision gas amount or tension value, depending on a magnitude of the impact by the collision and physical features of the occupant. Specifically, the gas amount is set to be somewhat larger than the ordinary-collision gas amount, but the tension value is set at the ordinary-collision tension value, and vice versa. The modification increases a variation of the controls.

In the first embodiment, the air bag and the seat belt are both controlled at the time of vehicle collision. The control of one of them falls within the scope of the invention. However, it is suggestible that the air bag and the seat belt are both controlled since the control of both of them more effectively protects the occupant against great impacts by collision, and increases a variation of the control by the system.

In the first embodiment, the image processing is used for detecting the line of sight of the occupant. A magnetic sensor or an eye camera, both being of the head-mount type, may be used for the same purpose, instead of the image processing (see Unexamined Japanese Patent Publication No. 6-189906).

In the first embodiment, the occupant's collision-recognition state is detected on the basis of the direction of the occupant's sight line. The direction of occupant's face may be used in lieu of the sight line direction. Further, a keeping-awake state of the occupant may also be used for the same purpose.

Second Embodiment

Figure 5:
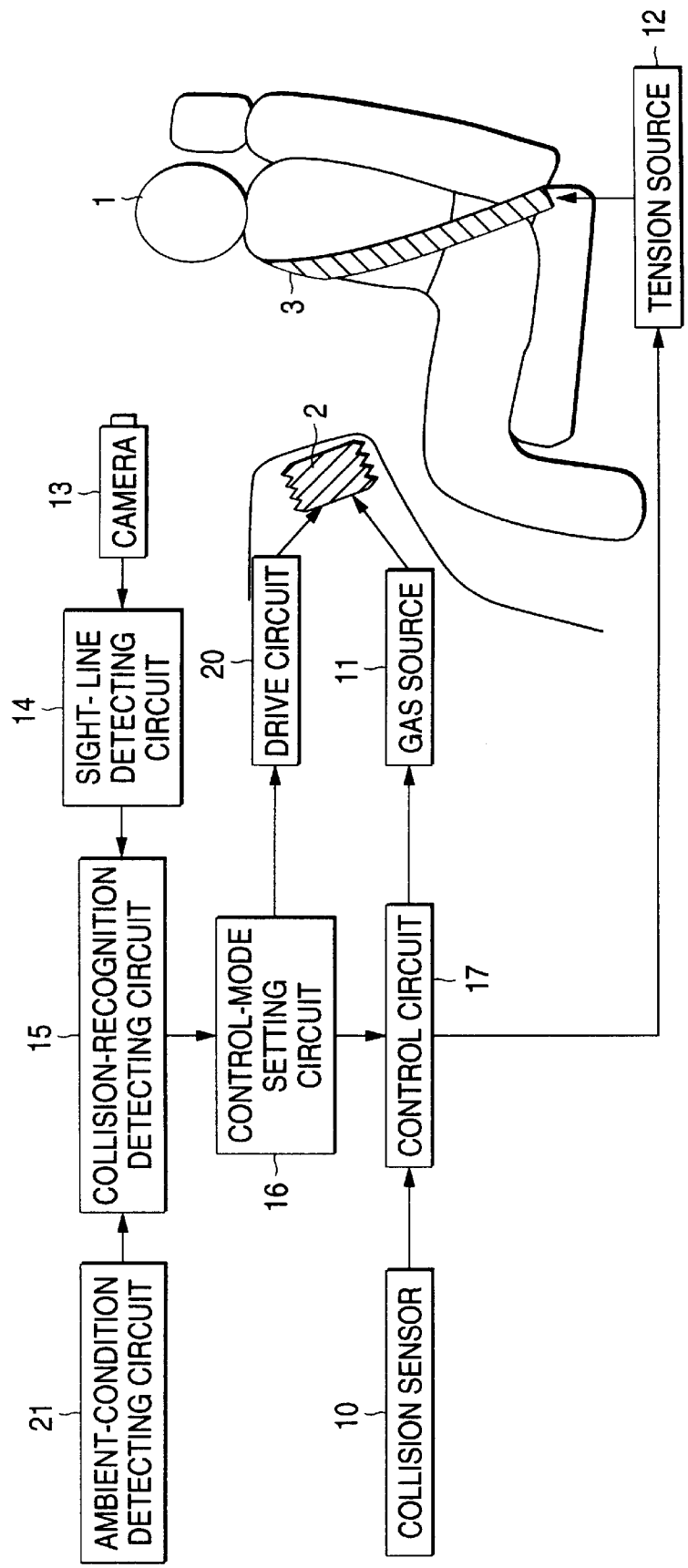
FIG. 5 shows in block and schematic form an arrangement of a vehicle occupant restraining system which is a second embodiment of the present invention.

FIG. 5 shows in block and schematic form an arrangement of a vehicle occupant restraining system which is an embodiment 2 of the present invention. In the figure, reference numeral 20 is a drive circuit for setting the inflation of the air bag in a proper direction by rotating or moving the air bag stored; and 21 is an ambient-condition detecting circuit for detecting ambient conditions of the vehicle.

Figure 6:
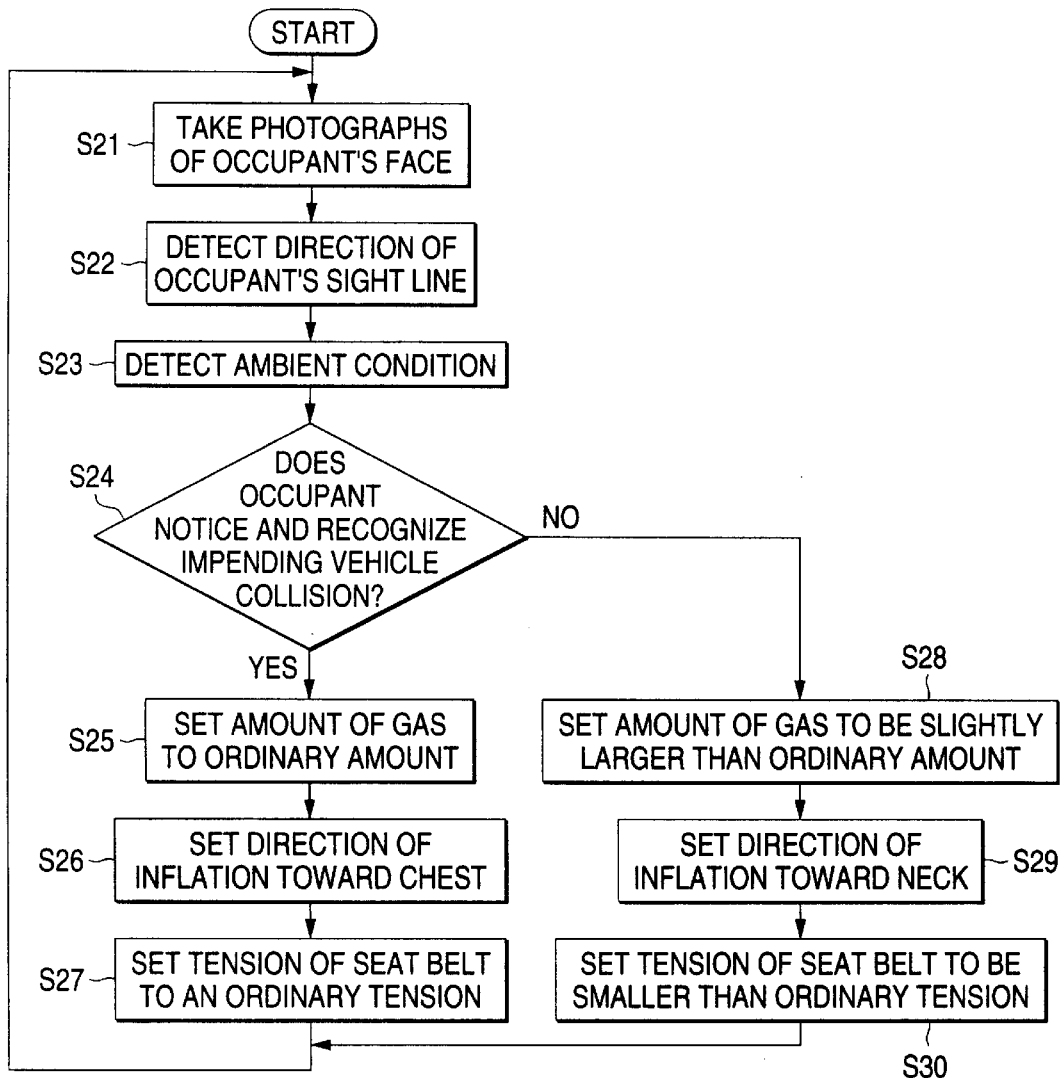
FIG. 6 is a flow chart showing the operation of the vehicle occupant restraining system of the second embodiment before a vehicle collision occurs.

The operation of the vehicle occupant restraining system of the second embodiment before a vehicle collision occurs will be described with reference to FIG. 6. A sequence of operations of a circuitry including the camera 13, sight-line detecting circuit 14, collision-recognition detecting circuit 15, ambient-condition detecting circuit 21, control-mode setting circuit 16, and drive circuit 20, is flow-charted in FIG. 6. The circuitry repeats those sequential operations from steps S21 to S30 at fixed periods independently of the operations of other circuits. In step S21, the camera 13 photographs the face of the occupant 1. In step S22, the sight-line detecting circuit 14 detects the direction of occupant's sight line by processing the face image photographed, and sequentially storing the results of the processing in a proper memory (or its proper memory area). The sight-line detecting technique may be used as used in the first embodiment. In step S23, the ambient-condition detecting circuit 21 detects an obstacle (or obstacles) present within a predetermined range, and if it is present, its direction relative to the vehicle carrying the system, and stores the results of the detection in a proper memory.

In step S24, the collision-recognition detecting circuit 15 examines time-sequential data on the sight-line direction at that time (the data having been gathered for ten (10) seconds), and further presence or absence of an obstacle (or obstacles) and the direction of the obstacle relative to the vehicle per se, whereby the circuit judges as to whether or not the occupant 1 notices and recognizes an impending vehicle collision. When the obstacle is present and the sight line of the occupant is directed to the obstacle within the time duration of 10 seconds, the collision-recognition detecting circuit 15 considers that the occupant recognized a pressing vehicle collision. When the obstacle is present but the sight line has not been directed to the obstacle for this time duration, the circuit 15 considers that the occupant failed to notice and recognize the impending vehicle collision. When the obstacle is absent, the circuit 15 assumes that the vehicle collision is about to happen, and judges whether or not the occupant noticed and recognized the impending vehicle collision depending on whether or not the occupant looked forward. In this case, when the occupant looked forward even once, the circuit 15 considers that the occupant recognized the vehicle collision. The time duration for gathering the time-sequential data is not limited to 10 seconds, but may be longer or shorter than 10 seconds, and it may be any other proper time duration determined depending on a vehicle speed, for example.

Figure 7:
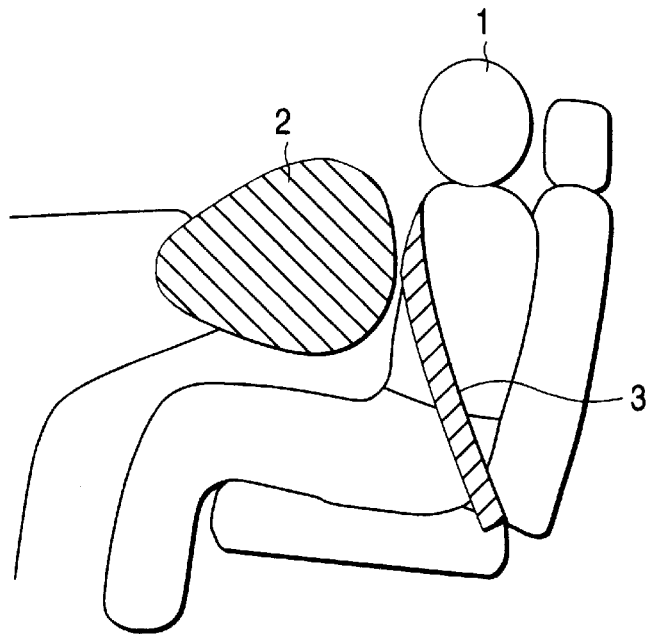
FIG. 7 is a schematic diagram useful in explaining a first control mode used in the vehicle occupant restraining system when the occupant notices and recognizes an impending vehicle collision in advance.

If the collision-recognition detecting circuit 15 judges that the occupant 1 has recognized that a vehicle collision is impending (step S24), the control-mode setting circuit 16 operates a first control mode. In this mode, the circuit 16 sets an amount of gas used for inflating the air bag 2 to a predetermined amount of gas (i.e., an ordinary-collision gas amount) for an ordinary vehicle collision (step S25). Then, in step S26, the circuit 16 causes the drive circuit 20 to rotate or move the air bag stored so that the air bag 2 expands toward the chest of the occupant 1. This control is carried out for uniformly protecting the chest of the occupant 1 and the parts above and below the chest, the head, neck, and belly (FIG. 7). In step S27, the control-mode setting circuit 16 sets a tension of the seat belt 3 to a value of tension (i.e., an ordinary-collision tension value) for the ordinary vehicle collision. This step merely sets the tension value of the seat belt at the ordinary-collision tension value, and does not expand the air bag 2 and extend/contract the seat belt 3.

Figure 8:
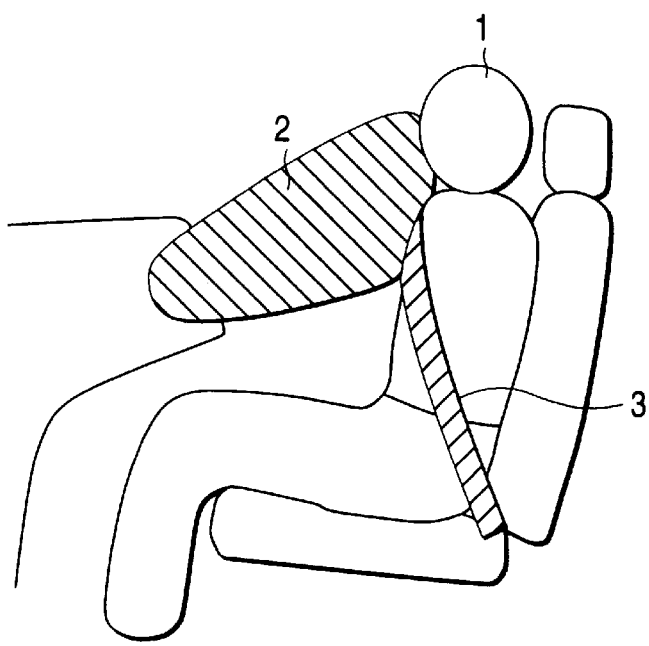
FIG. 8 is a schematic diagram useful in explaining a second control mode used in the vehicle occupant restraining system when the occupant inadvertently fails to notice and recognize an impending vehicle collision in advance.

If the collision-recognition detecting circuit 15 judges that the occupant 1 inadvertently fails to notice and recognize an impending vehicle collision occurrence in step S24, the control-mode setting circuit 16 then operates in a second control mode. In this mode, the circuit 16 sets the amount of gas to be slightly larger than the ordinary-collision gas amount in step S28. And the control-mode setting circuit 16 causes the drive circuit 20 to rotate or move the air bag 2 stored so that the air bag 2 expands toward the neck of the occupant (step S29). The reason why the expansion of the air bag 2 is directed to the neck is that before the collision, it is necessary to preferentially hold back the head and neck of the occupant 1 (FIG. 8). In a step S30, also in the second control mode, the control-mode setting circuit 16 sets a tension of the seat belt 3 to be somewhat weaker than the ordinary-collision tension, so that a reaction to the impact by collision is absorbed. The operations from steps S28 to S30 are for lessening the load on the neck and other parts of the occupant as in the first embodiment.

The sequence of the operations from the steps S21 to S30 is repeated.

Figures 3, 4:
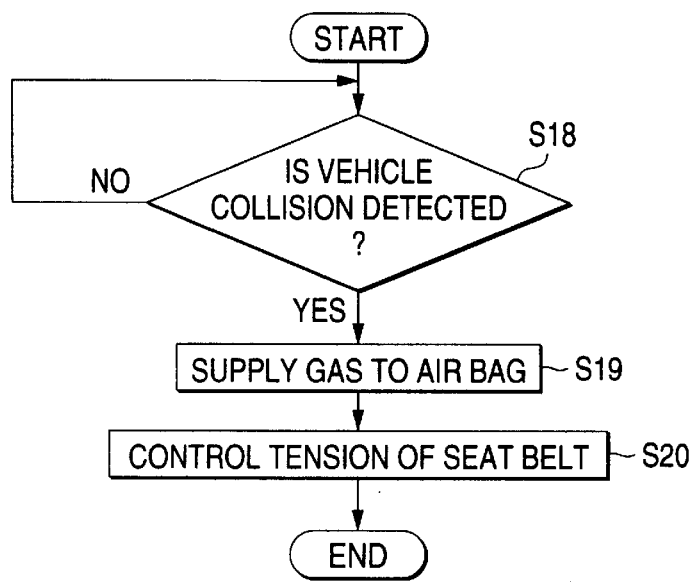
FIG. 3 is a table comparatively showing merits and demerits of the control modes used in the vehicle occupant restraining system.
FIG. 4 is a flow chart showing the operation of the vehicle occupant restraining system when a vehicle collision actually occurs.

The operation of the vehicle occupant restraining system after a vehicle collision occurs is the same as described in the flow chart of FIG. 4 for the first embodiment.

As described above, the vehicle occupant restraining system of the embodiment 2 controls the expansion of the air bag and the tension of the seat belt depending on the result of the detection by the ambient-condition detecting circuit, viz., occupant's recognition of the obstacle. Therefore, the vehicle occupant restraining system can judge whether or not the occupant notices and recognizes any other vehicle collision other than the frontal collision, and hence alleviates the load on the neck and other parts, whereby the system can reliably protect the occupant from the impact caused by this type of the vehicle collision.

Further, the direction of the inflation or expanding of the air bag is also controlled in the vehicle occupant restraining system of the embodiment 2. In this respect, the protection of the occupant is further ensured.

For the frontal collision, the vehicle occupant restraining system detects ambient conditions of the vehicle, and the sight line of the occupant, and judges whether or not the occupant recognizes an impending vehicle collision. The result of the judgement is more precise than by the first embodiment.

In the second embodiment, the control mode for controlling the inflation of the air bag and the tension of the seat belt is selected in advance before the collision sensor senses a vehicle collision. If required, the control mode may be selected in advance after the collision sensor senses a vehicle collision.

In the second embodiment, when the occupant is in a non-recognition state, the second control mode to preferentially protect the head and the neck of the human body is selected. In this control mode, the amount of gas supplied to the air bag is increased to be somewhat larger than the ordinary-collision gas amount and the air bag is expanded toward the neck of the occupant. The second embodiment may be modified such that a plural number of air bags are stored, and the number of air bags to be inflated and/or the locations of the air bags are selected depending on the occupant's recognition state.

In the second control mode of the second embodiment which is used when the occupant is in a non-recognition state, the amount of gas supplied to the air bag is increased to be larger than the ordinary-collision gas amount, the air bag is expanded toward the neck of the occupant, and the tension of the seat belt is decreased to be somewhat smaller in value than the ordinary-collision tension. In a modification of the second embodiment, the gas amount and the tension value are controlled such that one of them is increased or decreased while the other is fixed at the ordinary-collision gas amount or tension value, depending on a magnitude of the impact by the collision and physical features of the occupant. Specifically, the gas amount is set to be somewhat larger than the ordinary-collision gas amount and the air bag is expanded toward the occupant's neck, but the tension value is set at the ordinary-collision tension value. In an alternative, the tension value is set to be somewhat weaker than the ordinary-collision tension value, but the expanding direction of the air bag and the amount of gas supplied to the air bag are set as for the ordinary vehicle collision. The modification increases a variation of the controls and more flexibly copes with various situations of vehicle collision in protecting the occupant from great impacts by collision.

In the second control mode of the second embodiment, the air bag and the seat belt are both controlled at the time of vehicle collision. The control of one of them falls within the scope of the invention. However, it is suggestible that the air bag and the seat belt are both controlled since the control of both of them more effectively protects the occupant against great impacts by collision, and increases a variation of the control by the system.

In the second embodiment, the image processing is used for detecting the line of sight of the occupant. A magnetic sensor or an eye camera, both being of the head-mount type, may be used for the same purpose, instead of the image processing (see Unexamined Japanese Patent Publication 6-189906).

In the second embodiment, the occupant's collision-recognition state is detected on the basis of the direction of the occupant's sight line. The direction of occupant's face may be used in lieu of the sight line direction.

Further, a keeping-awake state of the occupant may also be used for the same purpose.

Third Embodiment

Figure 9:
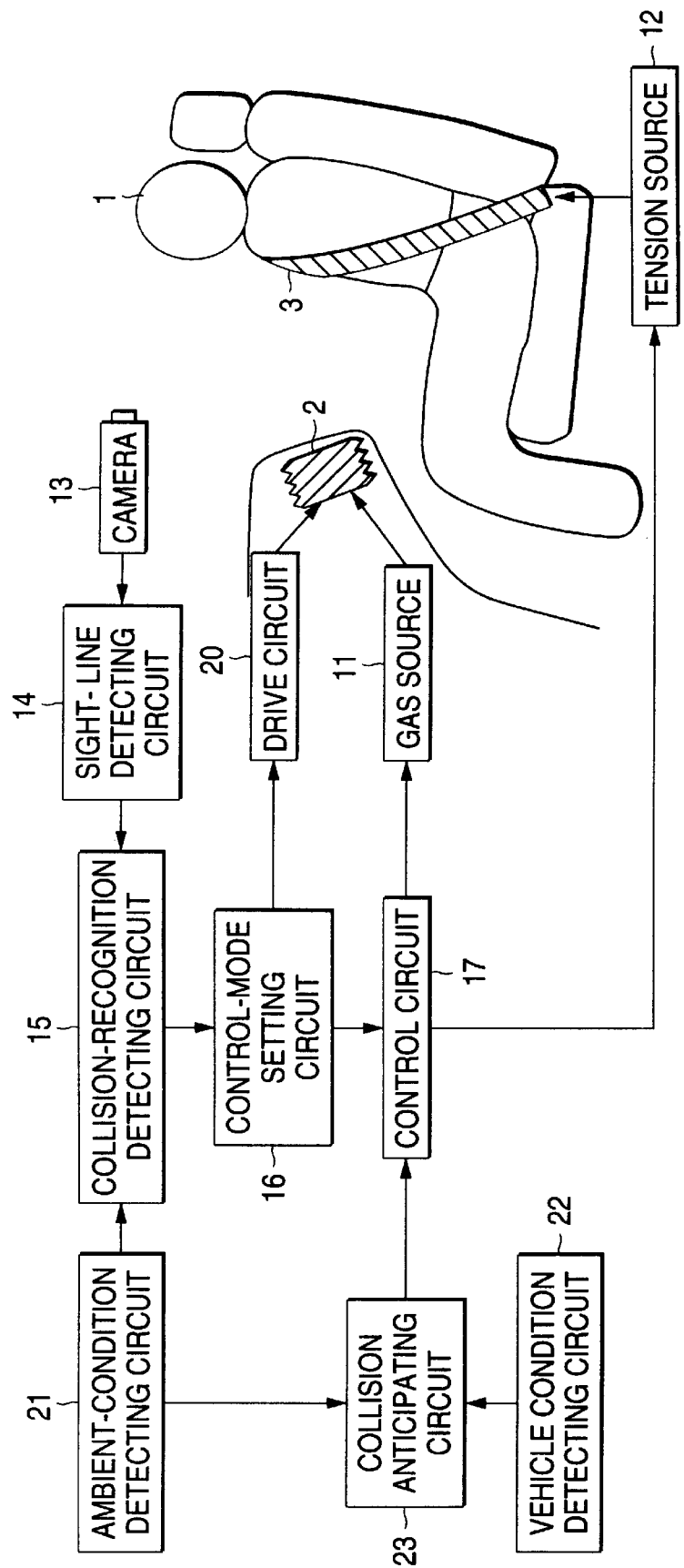
FIG. 9 shows in block and schematic form an arrangement of a vehicle occupant restraining system which is a third embodiment of the present invention.

FIG. 9 shows in block and schematic form an arrangement of a vehicle occupant restraining system which is a third embodiment of the present invention. In the figure, reference numeral 22 designates a vehicle condition detecting circuit 22 for detecting conditions of the vehicle per se, and numeral 23 is a collision anticipating circuit 23 for anticipating a vehicle collision on the basis of vehicle conditions and vehicle ambient conditions. In the vehicle occupant restraining system, the remaining circuits have the same functions as of the corresponding ones in the embodiment 2.

Figure 10:
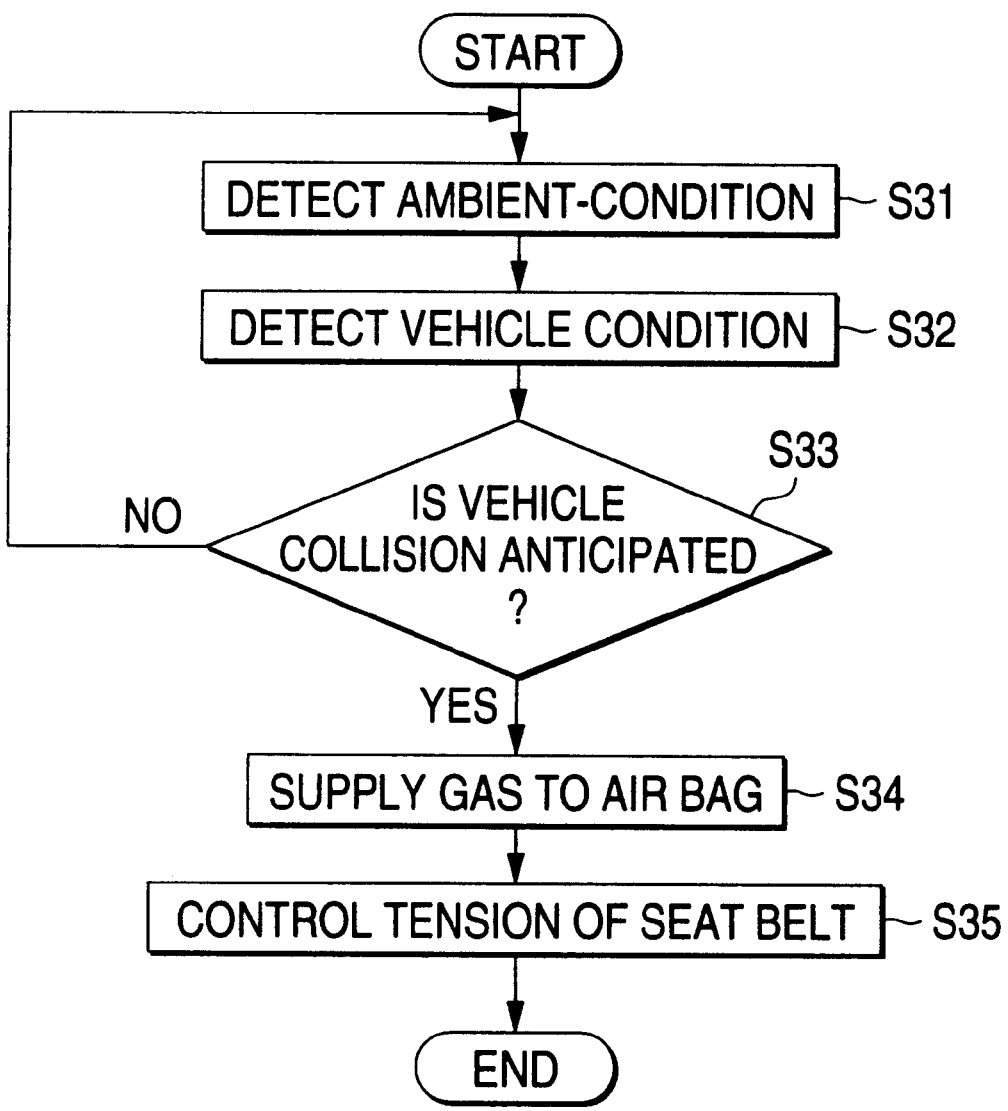
FIG. 10 is a flow chart showing a collision anticipating operation of the vehicle occupant restraining system of FIG. 9, and the operation of the same after the collision anticipating.

FIG. 10 is a flow chart showing a collision anticipating operation of the vehicle occupant restraining system of FIG. 9, and the operation of the same after the collision anticipating. Before a vehicle collision occurs, the vehicle occupant restraining system of the third embodiment operates as the vehicle occupant restraining system of the second embodiment.

In the flow of control, the ambient-condition detecting circuit 21 detects a distance to an obstacle and a relative speed of the vehicle in step S31. In the next step S32, the vehicle condition detecting circuit 22 detects a speed of the vehicle per se. In step S33, the detecting operations of the steps 31 and 32 are repeated till the collision anticipating circuit 23 anticipates a vehicle collision on the basis of the vehicle conditions and vehicle ambient conditions. An example of the collision anticipating method is to compute a braking distance and a braking time of the vehicle till the vehicle stops by use of a speed of the vehicle carrying the vehicle occupant restraining system under discussion, and to compute a position of the vehicle relative to the obstacle after the computed braking time.

When the collision anticipating circuit 23 anticipates an impending vehicle collision in step S33, the steps S34 and S35 are executed within a time period (referred frequently to as a before-collision time) from an instant that the collision is anticipated till the vehicle collision occurs. In step S34, the control circuit 17 causes the gas source 11 to supply to the air bag 2 an amount of gas set, at that time, by the control-mode setting circuit 16. In this case, the gas is slowly supplied to the air bag over the before-collision time, i.e., the time period up to the collision occurrence. In a step S35, the control circuit 17 drives the tension source 12 to control a tension of the seat belt 3 in accordance with a tension set, at that time, by the control-mode setting circuit 16. The result is that the air bag 2 is expanded and the air bag 2 is fixed or extended/contracted, thereby ensuring the protection of the occupant 1 from great impacts by the collision.

As described above, the third embodiment anticipates an impending vehicle collision by the collision anticipating circuit. Therefore, the air bag and the seat belt can be satisfactorily controlled since the before-collision time is present. Therefore, details may be specified for the control of protecting the occupant.

The third embodiment (vehicle occupant restraining system) controls the amount of gas to the air bag and the expanding direction of the air bag as the second embodiment does. Further, the third embodiment has various controls. Examples of the controls are: to stepwise expand the air bag in a multiple of steps; and to time the start of the expanding operation of the air bag depending on the before-collision time; and to expand a plural number of air bags in a staggering manner.

Further, the seat belt may be controlled in such a way that the seat belt is slowly retracted to gently tighten the occupant before the vehicle collides with an obstacle.

Additionally, it is noted that the air bag may gently be inflated during the before-collision time. This feature lessens an oppressive sensation of the occupant when he receives the expanded air bag. In this respect, use of the vehicle occupant restraining system of the embodiment 3 is suitable for the case where the occupant is a child. Further, the feature lessens the damage of the air bag per se, enabling the reuse of the air bag.

The vehicle occupant restraining system of the third embodiment selects the control mode, the first or second control mode, for controlling the air bag and the seat belt depending on whether or not the occupant recognizes an impending vehicle collision in advance, as described above. If the before-collision time is taken into consideration in designing the control of the air bag and the seat belt for the occupant's protection, finer controls are possible. Examples of the finer controls are to locate a peak expansion of the air bag when the vehicle collision occurs and to locate a maximum tension of the seat belt at that time.

Fourth Embodiment

A vehicle occupant restraining system which is a fourth embodiment of the invention will be described. The vehicle occupant restraining system is designed so as to protect a driver against great impacts by the collision.

Figure 11:
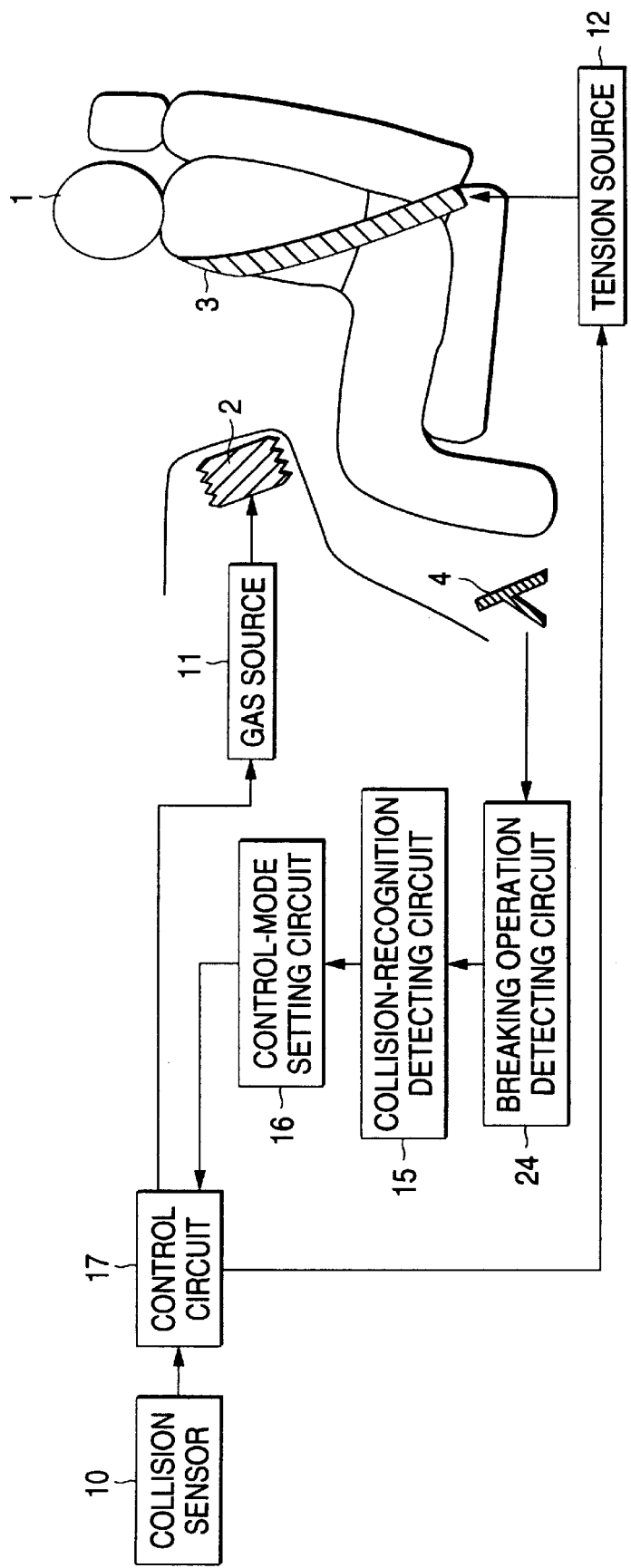
FIG. 11 shows in block and schematic form an arrangement of a vehicle occupant restraining system which is a fourth embodiment of the present invention.

FIG. 11 shows in block and schematic form an arrangement of a vehicle occupant restraining system of the fourth embodiment. In the figure, reference numeral 4 is a brake pedal, and 24 is a braking operation detecting circuit for detecting a condition of the braking. The remaining circuits in the vehicle occupant restraining system operate as those corresponding ones in the first embodiment system.

Figure 12:
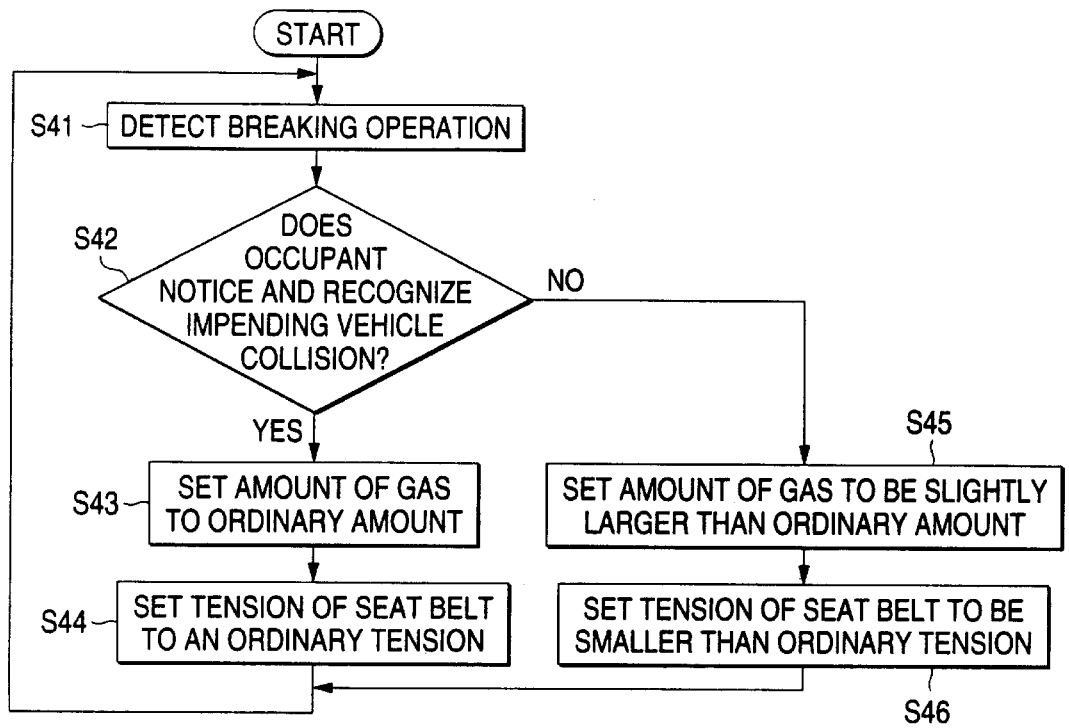
FIG. 12 is a flow chart showing the operation of the vehicle occupant restraining system of FIG. 11 before a vehicle clashes into an obstacle.
Figure 13:
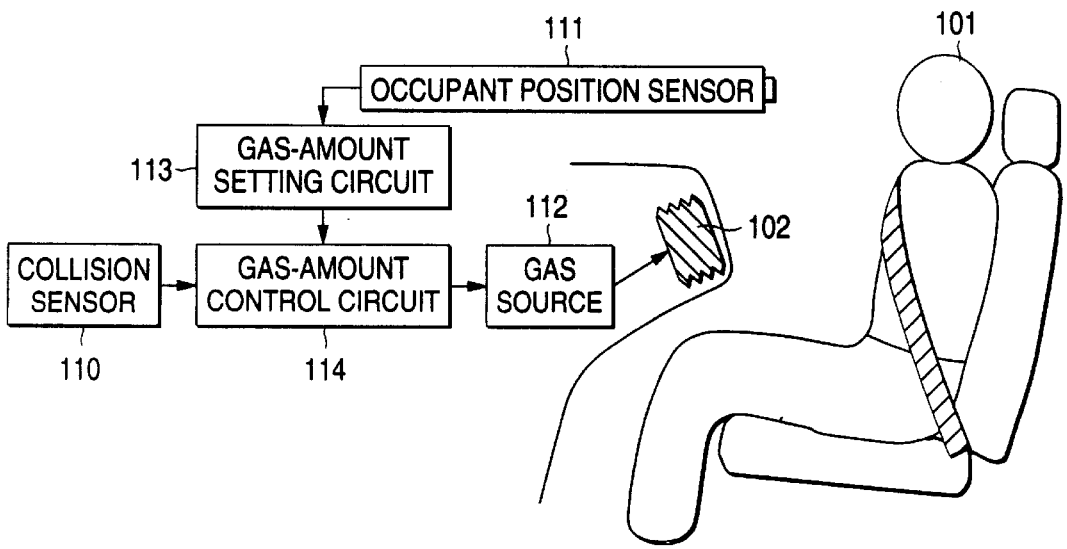
FIG. 13 is a block diagram showing a conventional vehicle occupant restraining system.
Figure 14A:
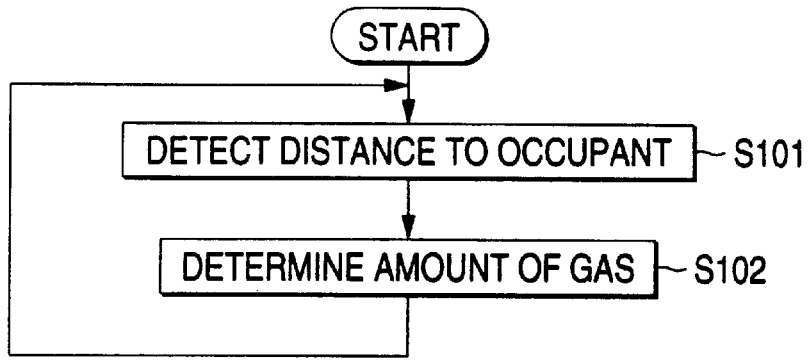
FIGS. 14A and 14B are flow charts showing the operation of the vehicle occupant restraining system of FIG. 13 before and after a vehicle collision occurs.
Figure 14B:
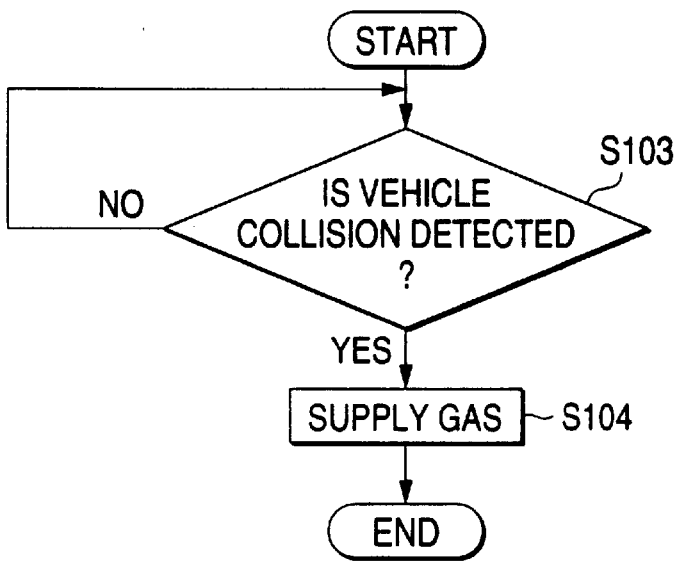

The operation of the vehicle occupant restraining system of the fourth embodiment before a vehicle clashes into an obstacle, will be described with reference to FIG. 12 showing a flow chart. A sequence of operations of a circuitry including the braking operation detecting circuit 24, collision-recognition detecting circuit 15, and control-mode setting circuit 16 is flow-charted in FIG. 12. The circuitry repeats a sequence of operations from steps S41 to S46 at fixed periods independently of the operations of the other circuits.

In step S41, the braking operation detecting circuit 24 detects a condition of the braking by a driver 1.

In step S42, the collision-recognition detecting circuit 15 assumes that a vehicle will collide with an obstacle immediately after the detection of the braking condition, and judges whether or not the driver 1 recognizes an impending vehicle collision on the basis of a condition of the braking operation by the driver. When the driver 1 puts on a brake pedal 4, the collision-recognition detecting circuit 15 considers that the driver recognizes an impending vehicle collision. When the driver 1 does not put on a brake pedal 4, the collision-recognition detecting circuit 15 considers that the driver fails to recognize an impending vehicle collision.

The operations from steps S43 to S46 are the same as those in the first embodiment, and executed depending on whether or not the drivers recognizes an impending vehicle collision.

The operations of the vehicle occupant restraining system of the fourth embodiment are the same as flow charted in FIG. 4 for the first embodiment.

As described above, the vehicle occupant restraining system of the fourth embodiment judges whether or not the driver recognizes the impending collision on the basis of a condition of the braking by the driver, not the line of sight of the driver. Therefore, there is no need of using a hardware, e.g., a camera, for detecting the collision recognition by the driver. The fourth embodiment has useful effects comparable with those of the first embodiment by use of a simple and cost-reduced construction.

A vehicle occupant restraining system constructed according to the present invention includes: occupant restraining means for restraining an occupant in a vehicle for his protection; collision-recognition detecting means for detecting whether or not the occupant recognizes an impending vehicle collision in advance; and control means for controlling the restraining operation of the occupant retraining means depending on the result of the detection by the collision-recognition detecting means. The vehicle occupant restraining system thus constructed can reliably protect the occupant even when he inattentively drives the vehicle and fails to recognize an impending vehicle collision or to be late in recognizing the collision.

The control means also controls a degree of the restraining. Therefore, even when he inattentively drives the vehicle and fails to recognize an impending vehicle collision or to be late in recognizing the collision, the vehicle occupant restraining system alleviates a load on the neck and other parts of the occupant, to thereby reliably protect the occupant.

The occupant restraining means consists of a plural number of restraining means. Therefore, in case of emergency, i.e., in the event of vehicle collision, the occupant is firmly held back by the plural number of retraining means, thereby ensuring a reliable protection of the occupant.

The occupant restraining means includes first restraining means and second restraining means. With this feature, in the event of vehicle collision, the use of two restraining means enable the vehicle occupant restraining system to retrain the occupant in different ways. Therefore, the protection function of the vehicle occupant restraining system is further enhanced.

The control means selects one of the first and second collision-recognition detecting means depending on the result of the detection by the collision-recognition detecting means. A plural number of controls may be combined for occupant protection, thereby increasing a variation of the controls and enhancing the occupant protection function.

The collision-recognition detecting means is an air bag. Use of the air bag brings about the following advantage. Even when the vehicle clashes into an obstacle in a state that the occupant fails to recognize the impending vehicle clash or is late in recognizing the same, the load on the neck, for example, of the occupant is lessened by controlling the air bag in various ways, viz., by varying a degree of expansion, the expanding direction and a rate of expansion of the air bag, a configuration of the expanded air bag, and like, whereby a satisfactory protection of the occupant is secured.

The control means controls an inflation of the air bag. With this feature, the head, neck and other parts of the occupant are firmly held back, to thereby lessen the load on those parts. If the air bag is slowly inflated, the air bag gently hits the occupant. The result is that the damaging of the occupant is lessened to such an extent as to secure a safety of child, the damage of the air bag per se is lessened, and re-use of the air bag is allowed.

The control means controls the direction in which the air bag inflates. This feature also provides a reliable holding of the neck, head or other parts of the occupant in an emergency, and hence, lessens the load on those parts of the human body.

The occupant restraining means is a seat belt. Even when he inattentively drives the vehicle and fails to recognize an impending vehicle collision or to be late in recognizing the collision, the vehicle occupant restraining system alleviates a load on the neck and other parts of the occupant, if the tension of the seat belt is properly controlled. The result is to reliably protect the occupant.

The control means controls a tension of the seat belt. This feature functions to absorb a reactive motion of the vehicle body in the event of its collision. As a result, the load on the neck and other parts of the occupant is reduced. It is possible to cause the seat belt to restrain the occupant in advance if the seat belt is controlled so as to be slowly retracted.

The vehicle occupant restraining system further includes ambient-condition detecting means for detecting ambient conditions of a vehicle. The collision-recognition detecting means detects whether or not the occupant recognizes an impending vehicle collision depending on the result of the detection by the ambient-condition detecting means. Therefore, the vehicle occupant restraining system detects whether or not the occupant recognizes any of other vehicle collisions than the head-on vehicle collision in advance.

The vehicle occupant restraining system includes ambient-condition detecting means for detecting ambient conditions of a vehicle, and collision-anticipating means for anticipating an impending vehicle collision on the basis of the result of the detection by the ambient-condition detecting means. The control means controls the restraining operation of the occupant restraining means on the basis of an anticipation made by the collision-anticipating means. Therefore, the vehicle occupant restraining system can anticipate an impending vehicle collision, and obtain a time till the collision occurs, the direction in which the vehicle collides with an obstacle, and the like. The system can control the restraining of the occupant with sufficient time for the control and in various ways.

The control means controls the restraining operation of the occupant restraining means on the basis of a time period ranging from an instant that the collision-anticipating means anticipates a vehicle collision till a vehicle collision actually occurs. Therefore, the control means can control the air bag and the seat belt since the before-collision time is present, and execute various controls in accordance with the before-collision time.

The control means controls a time at which the occupant restraining means starts the operation of restraining an occupant. Therefore, it is possible to properly retrain the occupant depending on the conditions of the occupant.

When the collision-recognition detecting means detects that an occupant fails to recognize a pressing vehicle collision, the control means performs such a control as to preferentially protect the head and/or the neck of the occupant against great impacts by collision. Therefore, even when the occupant inattentively drives the vehicle and fails to recognize an impending vehicle collision or to be late in recognizing the collision, the occupant will not suffer from whiplash and is satisfactorily protected.

When the collision-recognition detecting means detects that an occupant fails to recognize a pressing vehicle collision, the control means controls a tension of the seat belt in response to a reactive motion of the vehicle body to the impact by the collision.

The collision-recognition detecting means detects whether or not the occupant recognizes an impending vehicle collision on the basis of at least one of the direction in which the occupant turns his face, the direction of the sight line of the occupant and the keeping-awake state of the occupant. Therefore, it is possible to detect, with high precision, whether or not the occupant recognizes an impending vehicle collision.

Further, the collision-recognition detecting means detects whether or not the occupant recognizes an impending vehicle collision on the basis of a condition of the braking operation by the occupant. Therefore, there is no need of using additional devices for the occupant restraining control. Therefore, the cost to manufacture is reduced.

What is claimed is:

1. A vehicle occupant restraining system comprising:
   occupant restraining means for restraining an occupant in a vehicle for his protection;
   collision-recognition detecting means for detecting whether or not the occupant recognizes an impending vehicle collision in advance; and
   control means for controlling the restraining operation of said occupant retraining means depending on the result of the detection by said collision-recognition detecting means.

2. A vehicle occupant restraining system according to claim 1, wherein said control means controls a degree of the restraining.

3. A vehicle occupant restraining system according to claim 1, wherein said occupant restraining means has a plural number of restraining means.

4. A vehicle occupant restraining system according to claim 3, wherein said occupant restraining means includes first restraining means and second restraining means which is different from said first restraining means.

5. A vehicle occupant restraining system according to claim 3, wherein said control means selects one of the occupant restraining means depending on the result of the detection by said collision-recognition detecting means.

6. A vehicle occupant restraining system according to claim 1, wherein said occupant restraining means is an air bag.

7. A vehicle occupant restraining system according to claim 6, wherein said control means controls an inflation of the air bag.

8. A vehicle occupant restraining system according to claim 6, wherein said control means controls a direction in which said air bag inflates.

9. A vehicle occupant restraining system according to claim 1, wherein said occupant restraining means is a seat belt.

10. A vehicle occupant restraining system according to claim 9, wherein said control means controls a tension of said seat belt.

11. A vehicle occupant restraining system according to claim 1, further comprising ambient-condition detecting means for detecting ambient conditions of a vehicle, and
   wherein said collision-recognition detecting means detects whether or not the occupant recognizes an impending vehicle collision depending on the result of the detection by said ambient-condition detecting means.

12. A vehicle occupant restraining system according to claim 1, further comprising:
   ambient-condition detecting means for detecting ambient conditions of a vehicle, and
   collision-anticipating means for anticipating an impending vehicle collision on the basis of the result of the detection by the ambient-condition detecting means, and
   wherein said control means controls the restraining operation of said occupant restraining means on the basis of an anticipation made by said collision-anticipating means.

13. A vehicle occupant restraining system according to claim 12, wherein said control means controls the restraining operation of said occupant restraining means on the basis of a time period ranging from an instant that said collision-anticipating means anticipates a vehicle collision till a vehicle collision actually occurs.

14. A vehicle occupant restraining system according to claim 12, wherein said control means controls a time at which said occupant restraining means starts the operation of restraining an occupant.

15. A vehicle occupant restraining system according to claim 6, wherein when said collision-recognition detecting means detects that an occupant fails to recognize a pressing vehicle collision, said control means performs such a control as to preferentially protect the head and/or the neck of the occupant against great impacts by collision.

16. A vehicle occupant restraining system according to claim 10, wherein when said collision-recognition detecting means detects that an occupant fails to recognize a pressing vehicle collision, said control means controls a tension of the seat belt in response to a reactive motion of the vehicle body by its collision.

17. A vehicle occupant restraining system according to claim 1, wherein said collision-recognition detecting means detects whether or not the occupant recognizes an impending vehicle collision on the basis of at least one of the direction in which the occupant turns his face, the direction of the sight line of the occupant and the keeping-awake state of the occupant.

18. A vehicle occupant restraining system according to claim 1, wherein said collision-recognition detecting means detects whether or not the occupant recognizes an impending vehicle collision on the basis of a condition of the braking operation by the occupant.

* * * * *